United States Patent [19]
den Hartog et al.

[11] Patent Number: 5,800,592
[45] Date of Patent: Sep. 1, 1998

[54] PROCESS FOR PRODUCING MOLTEN PIG IRON WITH MELTING CYCLONE

[75] Inventors: Huibert W. den Hartog, Noordwijkerhout; Hendrikus K. A. Meijer, Uitgeest, both of Netherlands

[73] Assignee: Hoogovens Staal BV, Ijmuiden, Netherlands

[21] Appl. No.: 596,607

[22] Filed: Feb. 5, 1996

[30] Foreign Application Priority Data

Feb. 13, 1995 [NL] Netherlands .................. 9500264

[51] Int. Cl.$^6$ .................................................. C21B 13/14
[52] U.S. Cl. ............................ 75/453; 75/500; 75/501; 75/502
[58] Field of Search ........................... 75/453, 500, 501, 75/502

[56] References Cited

U.S. PATENT DOCUMENTS

| | | | |
|---|---|---|---|
| 4,849,015 | 7/1989 | Fassbinder et al. | 75/453 |
| 5,228,901 | 7/1993 | Taylor et al. | 75/453 |
| 5,567,225 | 10/1996 | Bernard et al. | 75/453 |

FOREIGN PATENT DOCUMENTS

| | | |
|---|---|---|
| 0236802 | 2/1987 | European Pat. Off. |
| 0237811 | 2/1987 | European Pat. Off. |

OTHER PUBLICATIONS van Langen et al. *La Revue de M'etallurgie CIT90* Mar. 1993 No. 3 Paris FR pp. 363–368.
Oeters et al. *Stahl und Eisen* No. 16 Aug. 14, 1989 Dusseldorf DE.

*Primary Examiner*—Melvyn Andrews
*Attorney, Agent, or Firm*—Watson Cole Stevens Davis, P.L.L.C.

[57] ABSTRACT

A process for producing molten pig iron uses direct reduction of iron ore in a pre-reduction stage followed by a final reduction stage.

In the pre-reduction stage iron ore is pre-reduced in a melting cyclone by means of a reducing process gas originating from the final reduction stage. A post-combustion occurs in the reducing process gas in the melting cyclone so that said iron ore in said melting cyclone is at least partly melted. The partly melted iron ore passes downwardly into a metallurgical vessel situated beneath the cyclone in which the final reduction takes place by supply of coal and oxygen, thereby forming a reducing process gas. A partial post-combustion occurs in the reducing process gas in the metallurgical vessel by means of said oxygen supplied thereto. The post-combustion ratio of the gas on exiting the metallurgical vessel is not more than 0.55. The coal is supplied directly into the slag layer so that said partial post-combustion in said metallurgical vessel is at least partly effected in the slag layer.

13 Claims, 2 Drawing Sheets

5,800,592

PROCESS FOR PRODUCING MOLTEN PIG IRON WITH MELTING CYCLONE

FIELD OF THE INVENTION

The invention relates to a process for producing molten pig iron by direct reduction of iron ore comprising a pre-reduction stage and a final reduction stage, and to apparatus for carrying out the process.

DESCRIPTION OF THE PRIOR ART

Processes of the type described above are known. In one known process the iron ore is pre-reduced in fluidized state in a reduction shaft. In another, the iron ore in the form of pellets is pre-reduced in a reduction shaft. In both these processes the temperature in the reduction shaft must be kept low in order to prevent the iron ore softening and the reduction shaft becoming blocked. Consequently the pre-reduced iron ore is conveyed to a metallurgical vessel in solid state at a temperature of 600°–900° C. Up to now these processes have not been used industrially. The problem is that the post-combustion of the process gas that occurs in the metallurgical vessel in the final reduction stage must be high in the metallurgical vessel, that is to say at least 0.40, in order to generate the heat required in the final reduction stage at a reasonable coal and oxygen consumption. This heat which is released above the melt is only of partial benefit to the melt. If post-combustion is less than 0.40, then a high coal consumption results and costly and low volatile coal must be used. In these known processes, on leaving the reduction shaft, the process gas contains much sensible heat and chemical energy. The sensible heat in the process gas may be used in different ways. The process gas with the chemical energy content is called export gas from this point.

In the article "The cyclone converter furnace" by van Langen et al. (Revue de Metallurgie, 90 (1993) No. 3, 363–368), there is disclosed a process in which iron ore is pre-reduced in a melting cyclone by means of a reducing process gas obtained in a final reduction stage. The melting cyclone is mounted above and in direct communication with a metallurgical vessel in which the final reduction stage takes place. Oxygen and coal are supplied to the melting cyclone. The pre-reduced iron ore flows downwardly from the melting cyclone into the metallurgical vessel. In the metallurgical vessel, a slag layer exists on top of a bath of pig iron.

EP-A-236802 describes a similar process in which coal is fed into the pig iron bath through bottom tuyeres of the vessel. Hot air at 1200° C. is blown into the vessel, and causes a post-combustion therein so that the process gas leaving the vessel has an oxidation degree of 40%. The hot air at 1200° C. is also blown into the melting cyclone, where a second post-combustion occurs to an oxidation degree of 80%.

EP-A-237811 describes a process similar to that of EP-A-236802, in which only half of the process gas from the metallurgical vessel passes to the melting cyclone, via a passage in which hot air is injected to cause a second post-combustion so that the gases enter the melting cyclone at 2500° C. The molten iron ore passes from the melting cyclone to the vessel via a separate opening.

NL-B-257692 also describes a pre-reduction in a melting cyclone, but does not discuss the post-combustion in the vessel.

SUMMARY OF THE INVENTION

An object of the invention is to provide a process for producing molten pig iron by direct reduction comprising a pre-reduction stage in a melting cyclone and a final reduction stage in a metallurgical vessel, in which, notwithstanding a low post-combustion degree in the metallurgical vessel, a low coal consumption results.

Another object of the invention is to provide a process for producing molten pig iron by direct reduction, in which it is possible to select the degree to which export gas is produced in relation to the use of the export gas.

According to the invention in one aspect, there is provided a process for producing molten pig iron by direct reduction of iron ore in a pre-reduction stage followed by a final reduction stage, comprising the steps of (a) in the pre-reduction stage conveying iron ore into a melting cyclone and pre-reducing it there by means of a reducing process gas originating from the final reduction stage, (b) effecting a post-combustion in the reducing process gas in the melting cyclone by supplying oxygen thereto so that said iron ore in the melting cyclone is at least partly melted, (c) permitting the pre-reduced and at least partly melted iron ore to pass downwardly from the melting cyclone into a metallurgical vessel situated beneath it in which the final reduction takes place, (d) effecting the final reduction in the metallurgical vessel in a slag layer therein by supplying coal and oxygen to the metallurgical vessel and thereby forming a reducing process gas, and effecting a partial post-combustion in the reducing process gas in the metallurgical vessel by means of the oxygen supplied thereto, the coal being supplied directly into the slag layer, (e) wherein the post-combustion ratio defined as $$\frac{CO_2 + H_2O}{CO_2 + CO + H_2O + H_2},$$

in which $CO_2$, $CO$, $H_2O$ and $H_2$ are the concentrations in percent by volume of these gases on exiting the metallurgical vessel, is not more than 0.55, and (f) wherein the partial post-combustion in the metallurgical vessel at least partly occurs in the slag layer.

The process of the invention produces more export gas with a greater chemical energy content, the lower the post-combustion ratio is set. In some cases it is desirable to produce more or less export gas. This process offers that possibility.

In the invention the coal is supplied directly into the slag layer. This means that the coal enters the slag layer in its solid particulate form, and not via solution in the pig iron bath, as in the method of EP-A-236802.

The direct injection of the coal into the slag layer, with the consequence that the first, partial post-combustion occurs at least partly in the slag layer, has the consequence that the efficiency of transfer of heat to the slag and the pig iron bath is high.

Furthermore, a thick slag layer, preferably 1 to 3 m deep may be obtained, in which the partial post-combustion and the reduction of the FeO by the carbon take place. In order to control foaming of the slag, it is desirable that at least some, preferably at least 25%, of the coal is supplied in the form of relatively coarse particles, i.e. particles of average size 6 mm or more.

Preferably the coal is supplied directly into the slag layer by at least one of (i) pneumatically transporting finely divided coal by at least one lance, (ii) pneumatically transporting finely divided coal by means of at least one side-tuyere of the metallurgical vessel discharging directly into said slag layer, and (iii) dropping coal particles having an average size of not less than 6 mm into the slag layer. Finely divided coal is coal having a particle size of less than 6 mm, preferably less than 1 mm.

In the process according to the invention, the coal consumption is preferably in the range 500 to 1000 kg per tonne of pig iron produced.

In the process, oxygen may be supplied in the form of air, or another mixture of oxygen and other gas, but preferably the oxygen supplied to the melting cyclone is injected into the cyclone in the form of substantially pure oxygen. This may be at low temperature, e.g. below 100° C. Similarly, preferably the oxygen supplied to the metallurgical vessel is in the form of substantially pure oxygen and is at a temperature of not more than 100° C.

Preferably the post-combustion ratio of the reducing process gas on exiting from the metallurgical vessel is in the range from 0.20 to 0.55, and more preferably from 0.30 to 0.45. Suitably a post-combustion ratio (as defined above) of the process gas on exit from the melting cyclone is at least 0.60, more preferably at least 0.70, and the coal consumption is in the range from 600 to 800 kg, more preferably 650 to 750 kg, coal per ton of pig iron produced. The process can produce pig iron at a low coal consumption. On leaving the melting cyclone, the process gas no longer has so much chemical energy and has a high post-combustion ratio.

Preferably high volatile coal is used. This is far less costly than low volatile coal. It has been found that high volatile coal can be used well in the process in accordance with the invention. In the known processes using a reduction shaft it is not possible to use high volatile coal because of the high post-combustion ratio required with these processes in the metallurgical vessel.

Preferably the pre-reduction degree (PRD) of the iron ore on leaving the melting cyclone, defined as $$1 - \frac{[O]_A}{[O]_B}$$

is in the range 0.15 to 0.30, wherein $[O]_A$ is the oxygen content in mole fraction of the pre-reduced iron ore from the melting cyclone and $[O]_B$ is the oxygen content in mole fraction of the iron ore supplied to the melting cyclone. The temperature of the pre-reduced iron ore on leaving the melting cyclone is desirably in the range 1200° to 1600° C., and preferably the reducing process gas is none of cooled, dedusted and reformed between the metallurgical vessel and the melting cyclone. Thus this gas may pass directly into the melting cyclone from the vessel by the same passage as the molten part-reduced ore.

Under these process conditions a very low coal consumption may be achieved.

A particular advantage is achieved by a process in which the concentration of the iron compounds $Fe_xO_y$ in the slag layer is kept low by supplying the coal to the slag layer at least partly in finely distributed state, i.e. with particle size less than 6 mm. In the final reduction of the iron compounds $Fe_xO_y$ in the slag into pig iron, the coal oxidizes into CO and $CO_2$. The final reduction occurs according to a formula of this kind: $R = k \times A \times C$. Here R is the reaction rate of the final reduction, k is a constant which however in initial approximation is inversely proportional to the characteristic, linear dimension of the coal particles, A is the specific surface of the coal particles, and C is the concentration of the iron compounds $Fe_xO_y$ in the slag.

Because of the finely divided state of the coal both the constant k and the specific surface A becomes greater. This results in the final reduction of the pre-reduced iron compounds $Fe_xO_y$ coming from the melting cyclone taking place more quickly so that the concentration of $Fe_xO_y$ in the slag remains lower. The advantage of this is that the slag affects the refractory lining of the metallurgical vessel less quickly. Because of the low wear on the refractory lining, its service life is longer.

Preferably the coal is at least partly supplied into the slag in the form of powder coal. This very finely divided state of the coal keeps the service life of the lining of the metallurgical vessel at a maximum.

In another aspect the invention is embodied in an apparatus for the production of molten pig iron by direct reduction of iron ore, comprising (a) a metallurgical vessel, (b) supply means for supplying coal directly into a slag layer formed, in operation of the apparatus, above a molten bath of pig iron in the metallurgical vessel, (c) supply means for supplying oxygen to the metallurgical vessel, (d) discharge means for discharging molten pig iron and slag from the metallurgical vessel, (e) a melting cyclone located above and in open connection with the metallurgical vessel so as to form a single reactor therewith, process gas passing in operation from the metallurgical vessel directly into the melting cyclone and at least partially melted pre-reduced iron ore passing from the melting cyclone directly into the metallurgical vessel, (f) supply means for supplying iron ore into the melting cyclone, (g) supply means for supplying oxygen into the melting cyclone, (h) discharge means for discharging process gas in a flow stream from the melting cyclone, (i) a steam-producing boiler in the discharge means for discharging process gas from the melting cyclone for generating steam from sensible heat of the process gas, (j) dedusting means downstream of the steam-producing boiler in the flow stream, for dedusting the process gas.

The coal supply means preferably comprises at least one of (i) at least one lance for pneumatically conveying coal in finely divided form, (ii) at least one side-tuyere of the metallurgical vessel for pneumatically conveying coal in finely divided form, and (iii) means for gravitationally dropping coal into the slag layer.

BRIEF INTRODUCTION OF THE DRAWINGS

The invention will be illustrated by description of embodiments, with reference to the drawings, in which.

DESCRIPTION OF THE PREFERRED EMBODIMENTS

Figure 1:
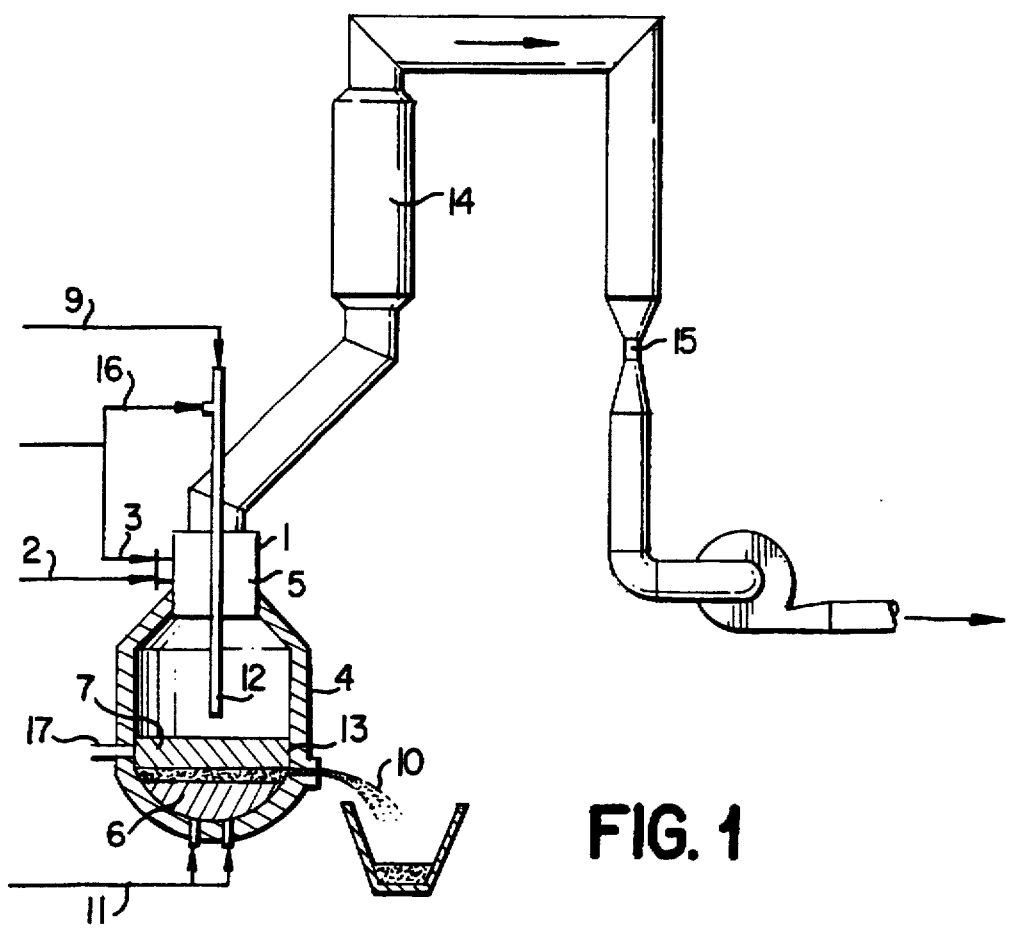
FIG. 1 is a flow sheet diagrammatically showing a process and apparatus in accordance with the invention.

FIG. 1 shows a melting cyclone 1 to which iron ore concentrate is supplied with a carrier gas through a supply system 2. At the same time substantially pure oxygen is supplied to the melting cyclone 1 via a supply system 3. The term "pure oxygen" is here used as understood in the steel-making art. Directly beneath the melting cyclone and in open connection with it is a metallurgical vessel 4. The iron ore is pre-reduced in the melting cyclone 1 and melted by a reducing process gas originating from the metallurgical vessel 4. In this process gas a post-combustion is maintained with the oxygen in the melting cyclone 1. The 15 to 30% pre-reduced and molten iron ore trickles at a temperature of preferably 1400°–1600° C. down the wall 5 of the melting cyclone 1 directly into the metallurgical vessel 4.

In the metallurgical vessel 4 there is during operation a melt 6 of pig iron with a slag layer 7 on top of it. Typically, this slag layer 7 is 2 m thick. Substantially pure oxygen is supplied to a lance 12 in the metallurgical vessel 4 by supply system 16 and coal by supply system 9. The pre-reduced iron ore is finally reduced by the coal supplied thus supplied directly into the slag layer 7, whereby a process gas comprising $CO_2$ and CO is formed that also contains $H_2O$ and $H_2$ from the hydrogen originating from the coal. Together with the oxygen supplied to the metallurgical vessel 4, the process gas is post-combusted in the metallurgical vessel to a post-combustion ratio of preferably 40% maximum. The heat released during this works to the benefit of the slag layer with a certain heat transfer efficiency (HTE). The process gas flows directly into the melting cyclone 1, is further post-combusted there as mentioned above, and leaves the melting cyclone 1 with a certain post-combustion ratio. The molten crude iron and the slag are tapped off at 10.

FIG. 1 also indicates that inert gas can be supplied at position 11 through the bottom of the metallurgical vessel 4 in order to stir the melt 6.

Together the melting cyclone 1 and the metallurgical vessel 4 form one entity, that is to say they are directly connected together by an opening through which both the molten iron ore and the process gas pass, without any connecting pipework because the melting cyclone 1 is placed directly on top of the metallurgical vessel 4.

FIG. 1 indicates by way of example the supply of oxygen and coal to the metallurgical vessel 4 by means of a central lance 12. Which discharges within, or just above, the slag layer 7. Many variants may be considered for this. For the supply of coal, not as lumpy coal but rather in finely distributed state, the preference goes to one or more lances or tuyeres 17, for example through the side wall of the metallurgical vessel 4 by which the finely distributed coal, preferably powder coal, is injected directly into the slag layer. This accelerates the final reduction of the pre-reduced iron ore in the slag layer 7 so that the refractory lining 13 of the metallurgical vessel 4 at the level of the slag layer is preserved.

As described above, some of the coal may be in lumpy form, i.e. of size >6 mm. This may be fed gravitationaly, via suitable openings in the vessel.

The process gas leaves the melting cyclone 1 at a temperature of 1200°–1800° C. This sensible heat is converted in a boiler 14 into steam, from which electricity may be generated. The electrical capacity thus obtained is more than adequate for producing the oxygen required. After boiler 14 the process gas still contains chemical energy by which electricity may also be generated.

The process can be run under an elevated pressure of for example 3 bars in the melting cyclone 1 and the metallurgical vessel 4.

FIG. 1 also shows that the process gas is dedusted after the boiler 14 in a venturi scrubber 15.

The process gas, which is called export gas after the boiler, still contains chemical energy, called export energy from this point, the quantity of which may be selected according to needs by adjusting the coal consumption of the process beyond the minimum coal consumption that is needed for the production of pig iron.

Figure 2:
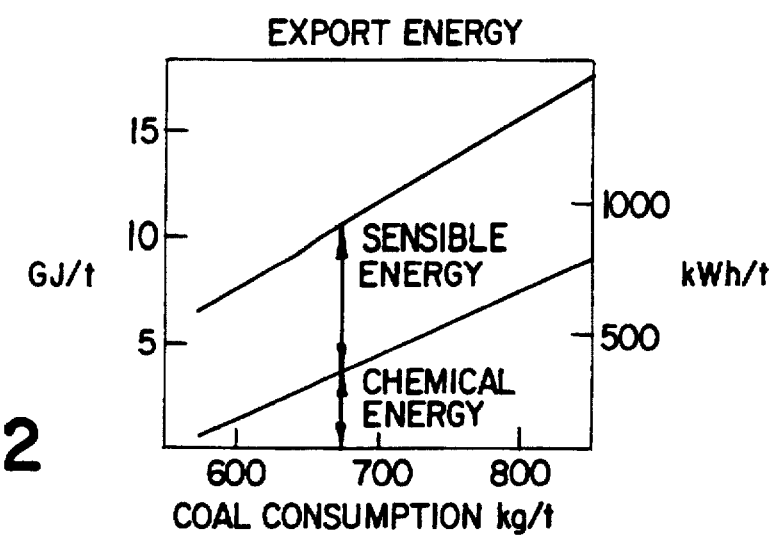
FIG. 2 shows by way of example the relationship between on the one hand the sensible heat and the chemical energy in the process gas that leaves the melting cyclone and the coal consumption on the other hand.

FIG. 2 shows by way of example the relationship between the sensible heat and the chemical energy in the process gas that leaves the melting cyclone on the one hand and the coal consumption on the other. The example of FIG. 2 applies for the case that the post-combustion ratio in the metallurgical vessel is 25% and that the heat transfer efficiency in the metallurgical vessel is 80%. The Figure shows that under these circumstances in the first instance the sensible heat in the process gas is virtually constant and independent of the coal consumption. However the chemical energy in the export gas increases with the coal consumption. The sensible heat in the process gas of about 5 GJ per ton of crude iron which is inevitable can be converted in a boiler into steam and then into electricity which may be used for the production of oxygen needed. However the quantity of chemical energy in the export gas can be selected by adjusting the post-combustion ratio. The minimum coal consumption under the given circumstances is approximately 640 kg per ton of crude iron. This Figure shows that in contrast to the known processes using a reduction shaft, the process in accordance with the invention does not result in a high, undesired quantity of export energy, but that the process in accordance with the invention may if so desired be used with a minimum of coal consumption without excessive export energy.

Figure 3:
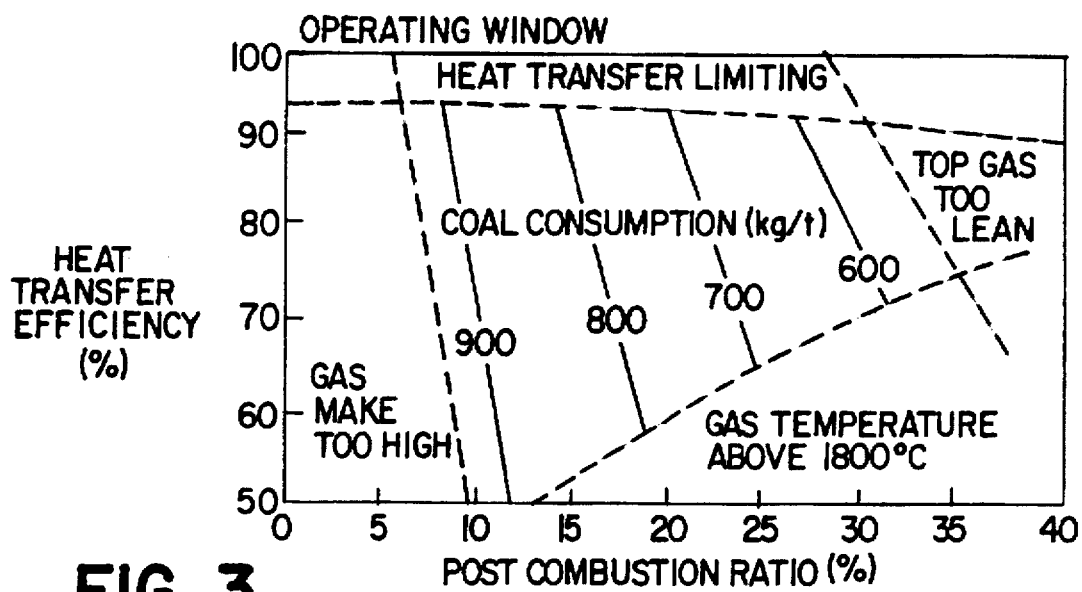
FIG. 3 is a graph showing by way of example one operating window of the process of the invention.

FIG. 3 shows by way of example one operating window of the process in accordance with the invention. The example of FIG. 3 applies for the case that the iron ore is pre-reduced in the melting cyclone by 20% and that the pre-reduced iron ore goes to the metallurgical vessel at a temperature of 1500° C. FIG. 3 takes into account a cooling loss of 500 MJ per tonne pig iron and no losses of coal and iron oxide. The example of FIG. 3 shows the relationship between the heat transfer efficiency from the metallurgical vessel and the post-combustion ratio in the metallurgical vessel with the coal consumption as parameter. With a low heat transfer efficiency the temperature of the process gas in the metallurgical vessel is too high; on the other hand there are limits to the highest value of the heat transfer efficiency of the process gas to the slag layer and the melt. Where the post-combustion ratio is too high the process gas in the melting cyclone becomes too lean; there is then insufficient CO in the process gas for achieving 20% pre-reduction in the melting cyclone. Where the post-combustion ratio is too low, the coal consumption becomes too high and too much process gas is produced. For a minimum coal consumption the post-combustion ratio must be high. In the example of FIG. 3 the minimum coal consumption is approximately 640 kg per ton of pig iron at a heat transfer efficiency of approximately 80%. This means that the post-combustion ratio in the melting cyclone is also high (at least 70%). By optimisation, the coal consumption could be reduced to 500 kg per ton of crude iron. As shown in FIG. 2, if more export energy is required then the process in accordance with the invention offers the possibility of generating export energy up to approximately 10 GJ per ton of crude iron at a coal consumption of some 900 kg per ton of crude iron.

Figure 4:
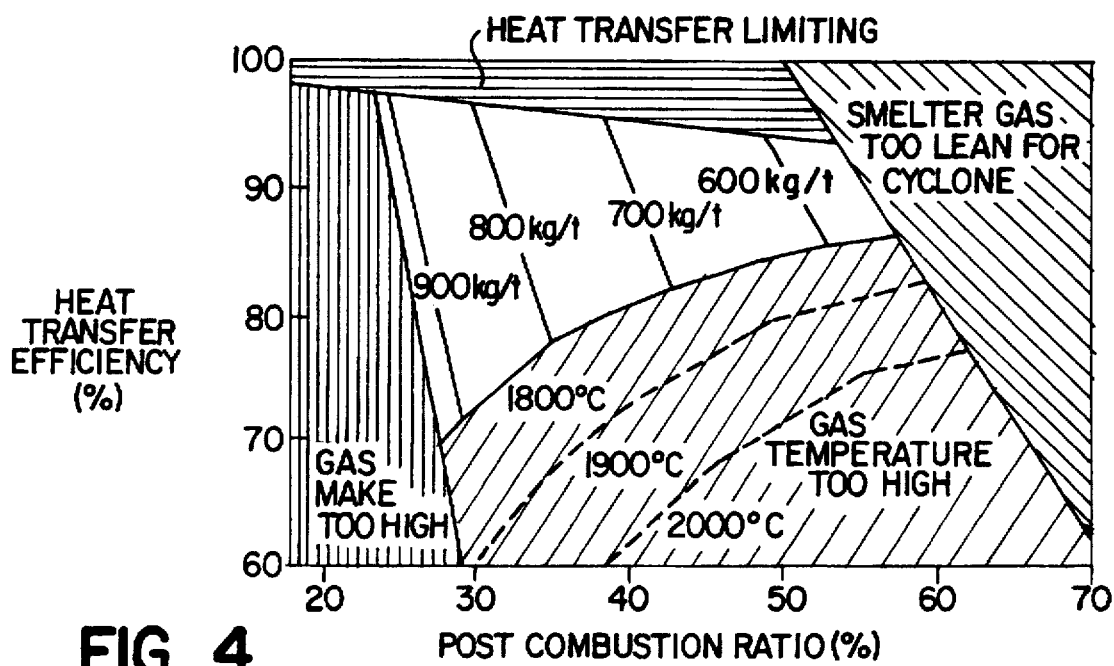
FIG. 4 is another graph showing another operating window of the invention.

FIG. 4 shows another operating window of the process of the invention, in which the post-combustion ratio may range from about 0.25 to 0.55. FIG. 4 takes into account a cooling loss of 1000 MJ per tonne pig iron which typically may occur and also losses of coal and iron oxide of 60 kg per tonne pig iron each, e.g. as dust, in both FIG. 3 and FIG. 4, medium volatile coal with 32 MJ/kg is used and the coal consumption is in the range 500–1000 kg/tonne pig iron.

What is claimed is:

1. A process for producing molten pig iron by direct reduction of iron ore in a pre-reduction stage followed by a final reduction stage which forms a reducing process gas, comprising the steps of
    (a) conveying iron ore into a melting cyclone and pre-reducing the iron ore in the pre-reduction stage by means of the reducing process gas formed in said final reduction stage; said reducing gas being directly fed into the melting cyclone from the metallurgical vessel situated beneath the melting cyclone,
    (b) effecting a post-combustion in said reducing process gas in said melting cyclone by supplying substantially pure oxygen thereto so that said iron ore in said melting cyclone is at least partly melted,
    (c) permitting the pre-reduced and at least partly melted iron ore to pass downwardly from said melting cyclone into the metallurgical vessel in which said final reduction takes place, and
    (d) effecting said final reduction in said metallurgical vessel in a slag layer therein by supplying coal and oxygen to said metallurgical vessel and thereby forming the reducing process gas, and effecting a partial post-combustion in said reducing process gas in said metallurgical vessel by means of said substantially pure oxygen supplied thereto, said coal being supplied directly into said slag layer,
    (e) wherein the post-combustion ratio defined as $$\frac{CO_2 + H_2O}{CO_2 + CO + H_2O + H_2}$$

in which $CO_2$, $CO$, $H_2O$ and $H_2$ are the concentrations in percent by volume of these gases on exiting said metallurgical vessel, is not more than 0.55, and
    (f) wherein said partial post-combustion in said metallurgical vessel at least partly occurs in said slag layer.

2. Process according to claim 1 including supplying said coal directly into said slag layer by at least one of (i) pneumatically transporting finely divided coal by at least one lance, (ii) pneumatically transporting finely divided coal by means of at least one side-tuyere of said metallurgical vessel discharging directly into said slag layer, and (iii) dropping coal particles having an average size of not less than 6 mm into the slag layer.

3. Process according to claim 1 wherein said coal supplied directly into said slag layer includes at least 25% by weight of particles having a size of not less than 6 mm.

4. Process according to claim 1 wherein the coal consumption in the process is in the range 500 to 1000 kg per tonne of pig iron produced.

5. Process according to claim 1 wherein said coal is supplied to the slag layer with a carrier gas by means of at least one injection lance submerged in the slag layer or discharging closely above the slag layer.

6. Process according to claim 1 wherein said substantially pure oxygen supplied to said metallurgical vessel is at a temperature of not more than 100° C.

7. Process according to claim 1 wherein said post combustion ratio of the reducing process gas on exiting from said metallurgical vessel is in the range from 0.20 to 0.55.

8. Process according to claim 1 wherein said post-combustion ratio of the process gas on exit from the melting cyclone is at least 0.60, and the coal consumption is in the range from 600 to 800 kg coal per ton of pig iron produced.

9. Process according to claim 1 wherein said coal supplied is a high volatile coal.

10. Process according to claim 1 wherein the pre-reduction degree (PRD) of the iron ore on leaving the melting cyclone, defined as

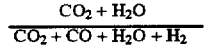

is in the range 0.15 to 0.30, wherein $[O]_A$ is the oxygen content in mole fraction of the pre-reduced iron ore from the melting cyclone and $[O]_B$ is the oxygen content in mole fraction of the iron ore supplied to the melting cyclone.

11. Process according to claim 1 wherein the temperature of the pre-reduced iron ore on leaving the melting cyclone is in the range 1200° to 1600° C.

12. Process according to claim 1 wherein the reducing process gas is none of cooled, dedusted and reformed between the metallurgical vessel and the melting cyclone.

13. Process according to claim 1 wherein said coal is at least partly supplied to said slag layer in the form of powder coal.

* * * * *